Dec. 12, 1950     A. N. SPANEL ET AL     2,533,971

CRIB OR THE LIKE SHEET

Filed April 30, 1947

INVENTORS.
ABRAHAM N. SPANEL
FRED W. ANDREWS
HAROLD A. OWEN

BY Ward Crosby Neal their ATTORNEYS.

Patented Dec. 12, 1950

2,533,971

UNITED STATES PATENT OFFICE

2,533,971

CRIB OR THE LIKE SHEET

Abraham N. Spanel, Princeton, N. J., and Fred W. Andrews and Harold A. Owen, Dover, Del., assignors to International Latex Corporation, Dover, Del., a corporation of Delaware Application April 30, 1947, Serial No. 744,840

6 Claims. (Cl. 5—354)

This invention relates to a sheet-like article, such as a sheet for a bed, and more particularly to a water-proof sheet of plastic designed for use with an infant's bed, such as a crib, carriage, bassinet or the like, or as a baby bib, make-up cape or the like articles.

An object of the present invention is to provide a sheet-like article for use as indicated above which is waterproof, resilient, pliable and which has a higher degree of resistance to the conditions to which it is subjected in use than rubber or the like material heretofore used.

Another object is to provide a sheet for the use described, which provides engageable means for anchoring the sheet in place and which means are especially adapted for the particular conditions encountered.

Various further and more specific objects, features and advantages of this invention will clearly appear from the detailed description given below taken in connection with the accompanying drawings which form a part of this specification and illustrate, by way of example, a preferred arrangement for carrying out the invention. The latter consists in such novel combinations of features as may be shown and described in connection with the device herein disclosed.

Figure 1:
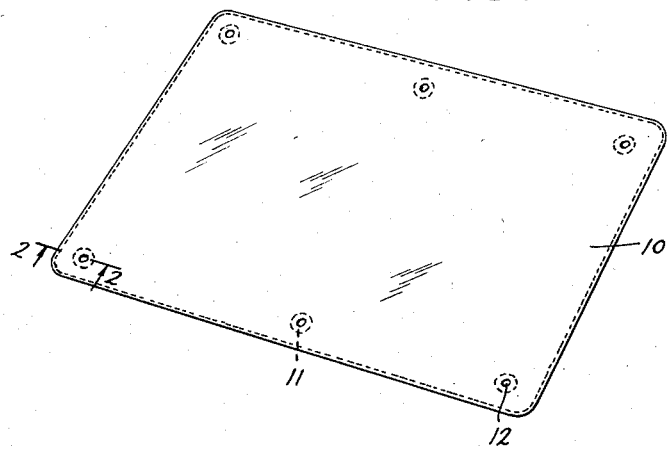
Fig. 1 is a perspective view of one form of the invention.

Referring to the drawings in further detail, the novel device is constituted by a sheet 10 of waterproof thermoplastic material such as plasticized polyvinyl chloride-acetate or the like. The size and shape of the sheet may be as desired and in the form shown is intended for use as a crib sheet of sufficient extent to cover the crib or bed of an infant. The sheet is provided with a plurality of rings or grommets 11 which are adapted for surrounding a like plurality of openings 12 which are formed in the margin of the sheet.

Figure 2:
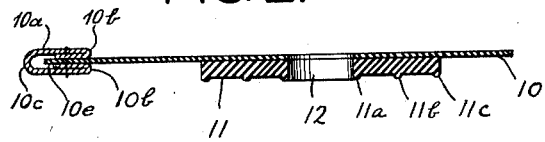
Fig. 2 is an enlarged detail sectional view taken on line 2—2 of Fig. 1.

The grommets or rings 11 which are distributed around the margin of the sheet 10 are preferably formed of the same, or the like, material as the sheet, that is, of plasticized polyvinyl chloride-acetate or the like thermoplastic material, and are of such a thickness that they will provide ample strength for said anchor-openings or perforations. Said rings are not sufficiently thick to have an appreciable amount of rigidity. However, they are of sufficient thickness to provide a reinforcing strength to said perforations. They are rather pliable and as indicated in Fig. 2, are sealed to the sheet. The adhering of the grommets 11 to the sheet 10 is accomplished by the application of heat and pressure, preferably by means of so-called electronic welding which provides a positive and strong autogenous bond therebetween.

Flexible grommets of this character are greatly superior to the usual metal grommets, both from the standpoint of comfort and lack of corrosion, breakage and the like.

In order to increase the life of the sheet herein described and in order to prevent undue stretching, tearing, or undue wearing of the edge thereof, the marginal edge of the sheet is reinforced by a multi-ply folded portion which in the present embodiment takes the form of a binding tape or strip such as 10a which is turned under along the lines 10b, as illustrated in Fig. 2, and is folded along line 10c around the edge 10e, whereby the turned-under and folded tape completely covers the outer edge 10e of the sheet 10. Instead of fusing the multi-ply reinforced margin, as would normally be suggested from the prior knowledge of securing thermoplastic sheets or folds together, we have discovered that a stitching of nylon or the like thread provides the proper elasticity commensurate with the inherent elastic properties of the thermoplastic sheet material, such as plasticized polyvinyl chloride-acetate. Furthermore, the use of such thread provides an article of more pleasing appearance and provides a convenient and entirely satisfactory production operation.

The use of a nylon thread to stitch the multiply reinforced edge of the plastic sheet completely overcomes the difficulties of tearing or pulling out of marginal threads or stitches. It is to be understood that the term "nylon" herein constitutes a generic term for any long-chain synthetic polymeric amide which has recurring amide groups as an integral part of the main polymer chain, and which is capable of being formed into a filament in which the structural elements are oriented in the direction of the axis. The relative elasticity of these two substances provides a novel combination with respect to the stitching of the reinforced margin of the sheet. The use of nylon instead of a thread of some other substance imparts an entirely new and different strength factor to the edge or margin of the sheet. This new strength factor is not due to any additional strength of the nylon thread but, as above mentioned, to its elasticity with respect to the said plastic sheet.

If a non-elastic thread is employed to sew the edges of said sheet, any strain or pull or stretching of the edges may result in not only the tearing out of the stitches but the cutting of the plastic or the elastic sheet material. If nylon is used, a tearing of the margin of the sheet will not so result because the nylon thread stretches sufficiently to preclude this. The stretching thereof is at a proper relative rate because of said relative elasticity of the plasticized polyvinyl chloride-acetate and the nylon.

It is highly desirable in the fabrication of sheets of this character to avoid any projection or any protuberances upon that surface of the sheet upon which the person, such as an infant, is to rest or come in contact. It is, of course, well known that the skin of an infant is extremely tender and subject to easy chafing by minor protuberances or raised portions upon its bedding. In order to avoid this and to provide other advantages, the grommet 11 is preferably formed in such a manner that the surface thereof, which is bonded to the sheet, is absolutely smooth and the grommet is relatively thin.

Each grommet 11 preferably is provided with reinforcing beads as at 11a, 11b, and 11c. The bead 11a is preferably at the margin of the central perforation thereof. The bead or embossing 11b is preferably intermediate the bead 11a and an outer bead 11c which preferably is formed upon the outer margin of the grommet. These embossed rings or beads are provided to give strength to the grommet at critical points thereof which will prevent tearing or wearing. Thus added strength is given without making the grommet unduly thick or rigid. Considerable pliability is thereby achieved without a sacrifice in strength. The beads may be conveniently formed simultaneously with and as a part of the operation of attaching the grommets by means of heat and pressure.

There is thus provided a novel sheet for the bedding of, for example, an infant which sheet is completely waterproof and which is provided with strong openings by which it may be secured to the bed, and is further provided with a folded margin of great strength which has stitchings therein which will not cut the sheet and which will not tear out. Furthermore, a sheet is provided which is free of protuberances or obstructions which may chafe or injure the skin.

While the invention has been described with respect to a certain preferred example which has given satisfactory results, it will be understood by those skilled in the art after understanding the invention that various changes and modifications may be made without departing from the spirit and scope of the invention, and it is intended, therefore, in the appended claims, to cover all such changes and modifications.

What is claimed is:

1. A pliable sheet or the like article of plasticized polyvinyl chloride-acetate or the like elastic thermoplastic having a plurality of perforations adjacent the margin thereof, a like plurality of plasticized polyvinyl chloride-acetate or the like thermoplastic grommets each surrounding a corresponding perforations, said grommets being autogenously secured to said sheet, the edges of said sheet being reinforced with a multi-ply plastic margin, and a stitching of thread through said reinforced margin, said thread consisting of any long-chain synthetic polymeric amide which has recurring amide groups as an integral part of the main polymer chain, and which is capable of being formed into a filament in which the structural elements are oriented in the direction of the axis.

2. In an article of the class described, a thin elastic sheet of plasticized polyvinyl chloride-acetate or the like, a plurality of pliable grommets adhered to said sheet adjacent the edges thereof and surrounding a like plurality of perforations in said sheet, the edges of said sheet being provided with a reinforced margin, and a fibrous thread of elasticity at least equal to the elasticity of said sheet, said thread stitched through said reinforced margin to hold same in folded condition.

3. In an article of the class described, a pliable thin sheet of plasticized polyvinyl chloride-acetate or the like, a plurality of pliable grommets of plasticized polyvinyl chloride-acetate or the like adhered to said sheet along the margin thereof, said grommets surrounding a like plurality of corresponding perforations, an elastic plastic tape binding the perimeter of said sheet to form a reinforced margin exterior to said grommets, and a stitching holding said bound perimeter in folded condition, said stitching comprising thread which is composed of any long-chain synthetic polymeric amide which has recurring amide groups as an integral part of the thin polymer chain, and which is capable of being formed into a filament in which the structural elements are oriented in the direction of the axis.

4. In an article of the class described, a pliable sheet of plasticized polyvinyl chloride-acetate or the like, a plurality of pliable grommets of plasticized polyvinyl chloride-acetate or the like secured to said sheet along the margin thereof and one surface thereof, said grommets surrounding a like plurality of corresponding perforations, said sheet having the edges thereof provided with a reinforced folded margin, and stitching holding said margin in folded condition, said stitching consisting of any thread which is composed of any long-chain synthetic polymeric amide which has recurring amide groups as an integral part of the main polymer chain, and which is capable of being formed into a filament in which the structural elements are oriented in the direction of the axis.

5. In an article of the class described, a pliable sheet of plasticized polyvinyl chloride-acetate or the like having a plurality of perforations adjacent to the margin thereof, a like plurality of flexible plastic grommets each surrounding a corresponding perforation, said grommets being autogenously secured to said sheet, the edges of said sheet being provided with a reinforced margin, and a stitching of elastic thread through said reinforced margin.

6. In an article of the class described, a pliable sheet of elastic thermoplastic, a plurality of flexible grommets of pliable plastic secured to said sheet along the margin thereof and upon one surface thereof, said grommets surrounding the like plurality of corresponding perforations, said sheet having the edges provided with a folded reinforced margin, and a stitching of elastic thread holding said margin in folded condition.

ABRAHAM N. SPANEL.
FRED W. ANDREWS.
HAROLD A. OWEN.

REFERENCES CITED

The following references are of record in the file of this patent:

UNITED STATES PATENTS

| Number | Name | Date |
|---|---|---|
| 1,332,776 | Sultanaki | Mar. 2, 1920 |
| 1,530,544 | Cooper | Mar. 24, 1925 |
| 1,800,178 | Cooper et al. | Apr. 7, 1931 |
| 2,138,610 | Overly | Nov. 29, 1938 |
| 2,345,421 | Perry | Mar. 28, 1944 |
| 2,354,436 | Stedman | July 25, 1944 |
| 2,415,150 | Stein | Feb. 4, 1947 |

Certificate of Correction

Patent No. 2,533,971

December 12, 1950

ABRAHAM N. SPANEL ET AL.

It is hereby certified that error appears in the printed specification of the above numbered patent requiring correction as follows:

Column 3, line 61, for the word "perforations" read *perforation*; column 4, line 29, after "and" insert *upon*;

and that the said Letters Patent should be read as corrected above, so that the same may conform to the record of the case in the Patent Office.

Signed and sealed this 13th day of February, A. D. 1951.

[SEAL]

THOMAS F. MURPHY,
*Assistant Commissioner of Patents.*